(12) United States Patent
Adibowo et al.

(10) Patent No.: US 10,810,511 B2
(45) Date of Patent: Oct. 20, 2020

(54) DATA INPUT IN AN ENTERPRISE SYSTEM FOR MACHINE LEARNING

(71) Applicant: SAP SE, Walldorf (DE)

(72) Inventors: Abraham Sasmito Adibowo, Singapore (SG); Weile Chen, Singapore (SG)

(73) Assignee: SAP SE, Walldorf (DE)

( * ) Notice: Subject to any disclaimer, the term of this patent is extended or adjusted under 35 U.S.C. 154(b) by 710 days.

(21) Appl. No.: 15/441,211

(22) Filed: Feb. 23, 2017

(65) Prior Publication Data

US 2018/0240038 A1 Aug. 23, 2018

(51) Int. Cl.
G06N 20/00 (2019.01)
G06F 16/2457 (2019.01)

(52) U.S. Cl.
CPC ....... *G06N 20/00* (2019.01); *G06F 16/24578* (2019.01)

(58) Field of Classification Search
CPC .......................... G06N 20/00; G06F 16/24578
See application file for complete search history.

(56) References Cited

U.S. PATENT DOCUMENTS

| 6,308,164 | B1 * | 10/2001 | Nummelin | G06Q 10/04 |
| | | | | 705/7.23 |
| 10,157,347 | B1 * | 12/2018 | Kasturi | G06F 16/3322 |
| 2005/0144022 | A1 * | 6/2005 | Evans | G06Q 10/06 |
| | | | | 705/7.42 |
| 2013/0103391 | A1 * | 4/2013 | Millmore | G06Q 10/06 |
| | | | | 704/9 |
| 2014/0025441 | A1 * | 1/2014 | Eberlein | G06Q 10/06 |
| | | | | 705/7.39 |
| 2014/0051506 | A1 * | 2/2014 | Ameling | G06Q 99/00 |
| | | | | 463/29 |

(Continued)

FOREIGN PATENT DOCUMENTS

WO  WO-2015159123 A1 * 10/2015

OTHER PUBLICATIONS

R. Sammut, D. Seychell and N. Attard, "Gannification of Project Management within a Corporate Environment: An Exploratory Study," 2014 6th International Conference on Games and Virtual Worlds for Serious Applications (VS-GAMES), Valletta, 2014, pp. 1-2.*

(Continued)

*Primary Examiner* — Daniel T Pellett
(74) *Attorney, Agent, or Firm* — Jones Day

(57) ABSTRACT

A framework for improving data set in an enterprise system for machine learning is provided. In accordance with one aspect, user input of a project update is provided by a user to an enterprise system. A record of the project update is created in the enterprise system based on the user input. The project update provided by the user into the enterprise system is analyzed using a gamification technique. The analysis includes quantifying the user's input of the project update to the enterprise system by assigning points to the user based on the project update provided to the enterprise system. The assigned points are displayed to the user on a user interface of a user device to enable friendly competition with other users which encourages more detailed and frequent project updates to the enterprise system by the user.

19 Claims, 6 Drawing Sheets

(56) References Cited

U.S. PATENT DOCUMENTS

| | | | | |
|---|---|---|---|---|
| 2014/0162220 | A1* | 6/2014 | Rao | G09B 19/18 434/107 |
| 2014/0164037 | A1* | 6/2014 | Rao | G06Q 30/0207 705/7.13 |
| 2014/0379914 | A1* | 12/2014 | Odenheimer | H04L 41/5041 709/225 |
| 2015/0088499 | A1* | 3/2015 | White | G06F 3/167 704/235 |
| 2015/0328550 | A1* | 11/2015 | Herzig | A63F 13/30 463/31 |
| 2016/0274904 | A1* | 9/2016 | Niazi | G06F 3/04817 |
| 2017/0060868 | A1* | 3/2017 | Rais Ghasem | G06F 16/243 |
| 2017/0154108 | A1* | 6/2017 | Kraus | G06F 16/243 |

OTHER PUBLICATIONS

Anantaram, C., et al. "Adapting general-purpose speech recognition engine output for domain-specific natural language question answering." (2015). (Year: 2015).*

Chatter, "Take Action at the Speed of Social", "http://www.salesforce.com/ap/chatter/features/", retrieved online on Jun. 6, 2016.

Hewlett-Packard, "Fantasy Sales Team", Hewlett-Packard Case Study, 2013, Austin, TX.

Aleks Peterson, "Four Salesforce Gamification Apps", TechnologyAdvice, "http://technologyadvice.com/blog/information-technology/four-salesforce-gamification-apps/", retrieved online on Jun. 6, 2016, TechnologyAdvice.

Wikipedia, "Ingress (video game)", "https://en.wikipedia.org/wiki/Ingress_%28video_game%29#Gameplay", retrieved online on May 25, 2016.

Leveleleven, "Product Tour", "https://leveleleven.com/product-tour/", retrieved online on Jun. 6, 2016.

Salesforce Appexchange, "Voice Assist for Salesforce", "https://appexchange.salesforce.com/listingDetail?listingId=a0N30000003J1XDEA0", retrieved online on Jun. 6, 2016.

* cited by examiner

FIG. 4

DATA INPUT IN AN ENTERPRISE SYSTEM FOR MACHINE LEARNING

TECHNICAL FIELD

The present disclosure relates to computer systems, and more specifically, to facilitating user input of data in an enterprise system for machine learning using techniques of gamification.

BACKGROUND

One of the major challenges in applying machine learning in the enterprise space is the lack of data available for training machine learning algorithms. Typically the majority of the data is stale (not entered timely enough), sparse (not much data are provided), and very far from complete. In addition, some users of an enterprise system such as salespeople seem to refrain from entering data into the system unless his or her confidence levels, for example, of the sales engagements are very high. In other words, when a deal is unlikely to be successful, the salesperson probably would not enter it to the enterprise system (e.g., a Customer Relationship Management (CRM) system). In turn this biases the training data towards successful deals and poses a major challenge in constructing machine-learning models that perform well and are valuable to assist those salespeople in the first place.

From the foregoing discussion, it is desirable to facilitate and encourage user input of data throughout projects in an enterprise system to improve the data set in the enterprise system for machine learning.

SUMMARY

A framework for improving data set in an enterprise system for machine learning is provided. In accordance with one aspect, user input of a project update is provided by a user to an enterprise system. A record of the project update is created in the enterprise system based on the user input. The project update provided by the user into the enterprise system is analyzed using a gamification technique. The analysis includes quantifying the user's input of the project update to the enterprise system by assigning points to the user based on the project update provided to the enterprise system. The assigned points are displayed to the user on a user interface to enable friendly competition with other users which encourages more detailed and frequent project updates to the enterprise system by the user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows an exemplary display of individual ranking of users on a user interface of a user device;

DETAILED DESCRIPTION

Figure 1:
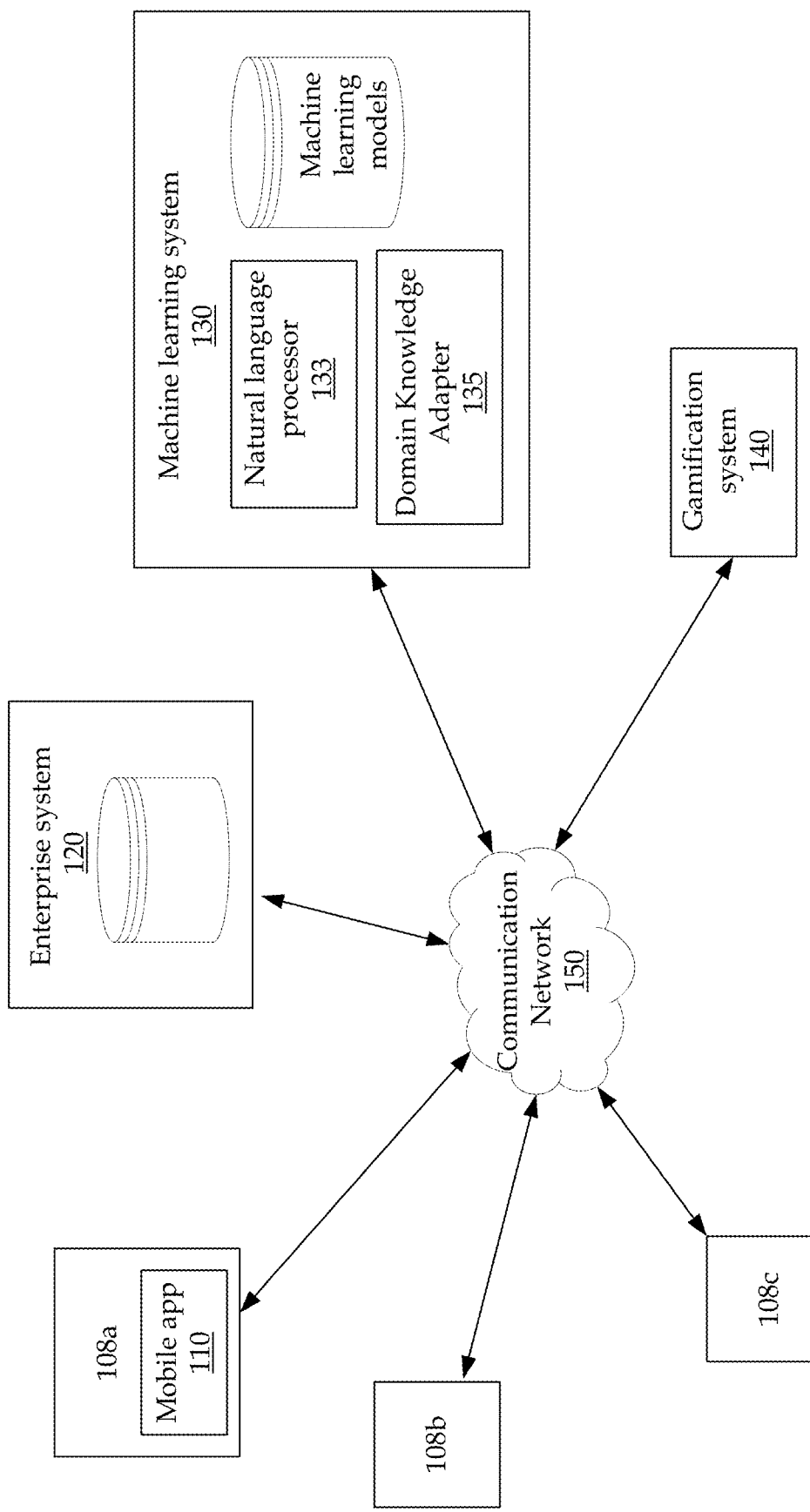
FIG. 1 shows a simplified diagram of an exemplary environment.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for facilitating user input of data in an enterprise system throughout the lifecycle of projects to improve the data set in the enterprise system for machine learning is described herein. In accordance with one aspect, the present framework provides a mobile application (mobile App) on a user device to enable user input of project updates in natural language. For example, user input of a project update may be to create a record of a new project in the enterprise system in response to a new sales opportunity or update the status of an on-going project such as minutes of a meeting with stakeholders, forwarding an e-mail related to the sales engagement into the enterprise system, changing the status of the engagement in the enterprise system (e.g., becomes "on hold"). A project update may be input via the mobile App by text entry or speech which is then converted to text. The mobile App sends the user input of the project update to a machine learning system for conversion to a structured project update.

In one implementation, the machine learning system converts the natural language text in the user input to a structured project update by querying an enterprise system containing structured data (e.g., CRM system). The machine learning system performs the conversion using machine learning models. After conversion, the machine learning system sends the structured project update to the mobile App to be displayed as a suggestion to the user. In the case where a suggestion is incorrect, the mobile App allows the user to correct the suggestion. The corrections are fed back to the machine learning system. This advantageously allows the machine learning system to improve on subsequent guesses using the machine learning models. In the case where the user confirms the suggestion, the mobile App sends the project update to the enterprise system (e.g., CRM system), the machine learning system and a gamification system.

The gamification system receives the project updates by the users from the mobile App. In one implementation, the gamification system quantifies the user's input of the project update to the enterprise system. The gamification system, in one implementation, tracks the user input of the project updates and assigns points to the users based on the project update input to the enterprise system. Employing gamification elements in the framework engages users to continuously input data throughout a project into the enterprise system, thus improving the data set of project updates for training the machine learning system. For example, the data set of projects received by the machine learning system is more complete, up-to-date or timely and unbiased for subsequent construction of machine learning models based on that data set.

The framework encourages users to input updates of all activities related to the projects they work on into the enterprise system including sales engagements that do not have a very high chance of success or even failed sales opportunities. This advantageously overcomes challenges where the machine learning systems suffers from deficiency of negative samples in the training data set which hinders the ability to develop a robust machine-learning model. When the training data set is unbiased towards successful sales engagements, the developed machine-learning model would be able to identify sales engagements that are not likely to be successful with more accuracy. In turn, the machine-learning model would be able to assist a salesperson in improving the odds of his or her future engagements.

It should be appreciated that the framework described herein may be implemented as a method, a computer-controlled apparatus, a computer process, a computing system, or as an article of manufacture such as a computer-usable medium. These and various other features will be apparent from the following description.

FIG. 1 shows a simplified diagram of an exemplary environment 100 that supports operation of an enterprise system and a machine learning system. The environment 100, for example, facilitates user input of data in the enterprise system throughout the lifecycle of their projects to improve the data set of projects received by the enterprise system and the machine learning system.

As shown, the environment includes user devices 108a-c, an enterprise system 120, a machine learning system 130 and a gamification system 140. The enterprise system, machine learning system and gamification system may act as servers and operate in a networked environment with the user devices. For example, the enterprise system may have a distributed architecture, such as client-server architecture. Other types of architectures may also be useful. A server may include one or more computers or servers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. The computers or servers are connected through a communication network 150, such as internet, intranet, LAN, WAN or a combination thereof. Other type of networks or network connections may also be useful. For example, network connections may include a WIFI or a 3G/4G/LTE connection. In some cases, the network may be a cloud.

The enterprise system, machine learning system and gamification system, for example, are separate servers. Providing the enterprise system, machine learning system and gamification system on the same server may also be useful. In some implementations, the gamification system and/or machine learning system may be a module in the enterprise system. Other configurations of the enterprise system, machine learning system and gamification system may also be useful. The servers may be located in a single or multiple locations.

As for a user device, it may be any local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as a user device. For example, the user device may be a mobile computing device, such as a laptop, a tab or a smart phone, or a PC. Other types of processing devices may also be used.

A user may connect to the enterprise system, machine learning system and gamification system using the user device. For example, the user device may include a mobile App 110 that connects to the enterprise system, machine learning system and gamification system. The user device may be referred to as the client side while the enterprise system may be referred to as the server side. Other types of configurations may also be useful.

The enterprise system includes one or more enterprise applications such as a customer relationship management (CRM) application and one or more enterprise databases. In one implementation, an enterprise database may be a knowledge base containing structured data of enterprise information such as projects in an enterprise and customer information including customer profile and activities with the enterprise. For example, the enterprise system contains domain knowledge of what salespeople are working on. The enterprise system, for example, includes a CRM database. In one implementation, an enterprise database includes a HANA database from SAP SE. Other types of databases may also be useful. The database, for example, may be a database server.

In one implementation, the enterprise database stores project information which may include records such as project logs or entries of activity updates throughout the lifecycle of projects (e.g., procurement process). For example, the records may include customer information for a sales opportunity, people (names and contact details) involved in a sales engagement, the status of the engagement, appointments, calendars, alerts, notes, documents, tasks and e-mails related to the engagement. The lifecycle of a project, for example, may be the entire sales engagement process from pre-qualification, negotiation, closing, and after-closing. The enterprise system creates and stores a project log in the enterprise database each time it receives a user input of a project update. Additionally, the project information and corresponding customer information may be provided through various data sources and channels or points of contact between the customer and the salesperson such as, for example, the salesperson's input data, the company's website, telephone, e-mail, marketing materials and social media.

In one implementation, a user (e.g., employee of the enterprise such as the salesperson) may input data of a project into the enterprise system using a mobile App 110 on a user device. The input data of the project, for example, may be a status update of a sales engagement or a new record of a new sales opportunity. The framework allows the user to input data regarding the project update in natural language. The mobile App provides the user with an option to input data of the project by text input or voice input. The user input in natural language contains unstructured information of the project update. The framework converts the unstructured data in the user input into structured project update.

Figure 2:
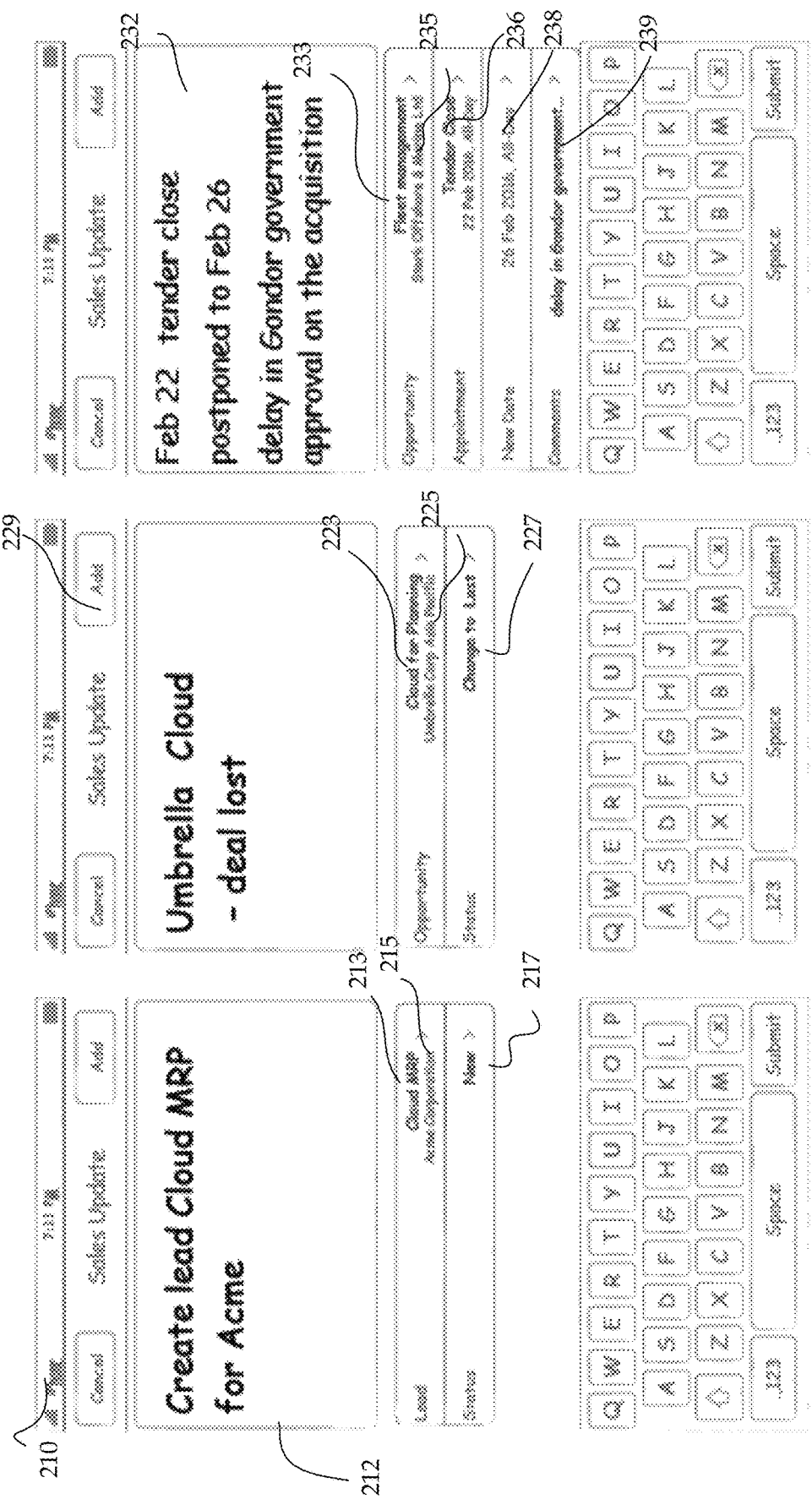
FIGS. 2A-2C show an exemplary user interface for providing user input of project updates using natural language.

In the case of text input, the mobile App displays on a user interface 210 of the user device a text entry field 212 as illustrated in FIG. 2A. The user may input the project update in free-form natural language text in the text entry field. This allows the user to input updates of activities related to, for example, a sales opportunity in descriptive natural-language text via the free-text input field in addition to standard multiple-choice fields that a traditional CRM application utilize. In the case of a voice input, the user may provide a speech regarding the project update using a voice interface in the user device and the mobile App invokes the operating system of the mobile device to convert the voice input to natural language text. The mobile App sends the user input of the project update to the machine learning system for processing.

The machine learning system includes a natural language processor 133, a domain knowledge adapter 135 and machine learning models stored in a database of the machine learning system. In one implementation, the machine learning system converts the unstructured information in the user input into a structured project update. The machine learning system, in one implementation, converts the natural language text in the user input to structured data by querying the enterprise system.

The natural language processor parses the natural language text in the user input. For example, the natural language processor parses the natural language text to extract semantic information from the text. For example, some of the semantic information identified during parsing may include company names, lead or opportunity or engagement title, enumeration values from CRM data, and action verbs.

The natural language processor invokes the domain knowledge adapter to query the enterprise system. In one implementation, the natural language processor converts the unstructured data of a project update in the user input to structured project update based on the information available in the enterprise system. The natural language processor performs the conversion using machine learning models in the machine learning system. The machine learning system returns the structured data to the mobile App. The structured project update (or structured data) is displayed on the user interface (UI) of the user as a suggestion.

Upon receiving a confirmation from the user of the suggestion, the mobile App sends the confirmed structured project update to the enterprise system for updating the status of the project. The enterprise system creates a record of the project update and a unique identifier for the update. The enterprise system returns the created unique identifier of the project update to the mobile App. The mobile App then sends the project update to the machine learning system and the gamification system. For example, the mobile App sends a notification containing the created unique identifier of the corresponding project update to the machine learning system and the gamification system.

In the case where the suggestion is incorrect or inaccurate, the user has the option to select a corresponding field of the suggestion to change the suggestion. For example, a field may be selected by a tap to change the displayed information in that field. Another user interface display may be presented to allow the user to change the information. For example, the user may overwrite the suggestion to provide a desired information for the project update. Upon confirmation of the changes, the mobile App sends the structured project update to the enterprise system to create a record of the project update and the unique identifier of the update.

As shown in FIG. 2A, the user input for example may be "Create lead Cloud MRP for Acme". The user input may be a written text typed in by the user, or alternatively, spoken using a voice interface of the user device and subsequently converted to text by the operating system of the user device. The machine learning system converts the user input to a structured data which identifies the lead or (opportunity or engagement title) 213 as "Cloud MRP", the company name 215 as "Acme Corporation" (the machine learning system expands the word "Acme" into a full legal name "Acme Corporation" based on data fetched from the CRM system), and status 217 of the sales engagement as "New" (e.g., "New" is an enumeration value for the "Status" field of a "Lead" type record in the CRM system. In some implementations, the record identifier for the company is also fetched and will be used as part of the status update in the project update log to be created once the user confirms the suggestion.

As illustrated in FIG. 2B, another exemplary user input may be "Umbrella Cloud—deal lost". The machine learning system converts the user input to a structured project update which includes an identification of the opportunity 223 as "Cloud for Planning", the company 225 as "Umbrella Corp Asia Pacific", status 227 as action to "Change to Lost". The machine learning system presents the structured project update to the user as a suggestion. The suggestion may be confirmed by selecting the "Add" button 229, for example.

In another example, the user input may be a natural speech via a voice interface of the user device which is converted to the natural language text "Feb. 22 tender close postponed to Feb. 26 delay in Gondor government approval on the acquisition". The natural language text is displayed in the text entry field 232 of the user interface by the mobile App, as illustrated in FIG. 2C. The machine learning system converts the user input to a structured project update which identifies an opportunity 233 as "Fleet Management", the company 235 as "Stark Offshore & Marine Ltd", appointment 236 as "Tender Close, 22 Feb. 2016, All-Day", New Date (for Appointment) 238 as "26 Feb. 2016", and comments 239 as "delay in Gondor government on the acquisition". For example, the CRM system contains information of a current opportunity called "Fleet Management" with the company "Stark Offshore & Marine Ltd" which the user is working on.

Upon parsing the text "Feb. 22", the machine learning system identifies a date and assumes it is the closest date to fill in the year, and upon parsing the text "postponed to Feb. 26" and with the information of an appointment on Feb. 22, the machine learning system proposes a change of appointment date (or creation of a new appointment, depending on whether there was a "Tender Close" appointment for Feb. 22 in the user's on-device calendar). Upon confirmation of the suggested structured project update by the user, for example by selecting an Add button, a status update on the opportunity is sent to the CRM system. The CRM system creates and stores a project update log for the status update.

In the case where the suggestion is incorrect or inaccurate, the user has the option to select the corresponding fields to change the suggestion. For example, to change the suggested appointment 236, the field may be selected, for example, by a tap. Another user interface display may be presented to allow the user to change the appointment title or the new appointment date. The mobile App enables user input of project updates in natural language which allows for easy and convenient updates as well as reducing friction of data input. This encourages more detailed and frequent project updates by the users.

In one implementation, the framework encourages and improves data input, for example, by salespeople into the enterprise system using a gamification technique. The gamification system receives the project update and processes the user's project updates using a points system. In one implementation, the gamification system employs the points system to quantify the user's project updates to the enterprise system. For example, the gamification system quantifies the user input of project updates to the enterprise system and assigns points to users for each project update that the user inputs into the enterprise system. The gamification system, for example, assigns points for all logs of project update created in the enterprise system by users via the mobile App. Accordingly, the gamification system assigns more points to users as the users provide more input data of project updates into the enterprise system.

In accordance with one aspect, points are assigned to users based on the activities or actions in the project updates which is input into the enterprise system. The gamification system assigns points regardless whether a sales engagement is successful. This encourages input of project updates which include unsuccessful activities. Accordingly, data set provided by users to the enterprise system overcomes deficiency of negative samples. The framework facilitates the data entered to bring the CRM system in a position close to real-time status of all sales engagements for example.

In one implementation, points are assigned based on the type of activity in the project update and amount or detail of data entered by the user. The gamification system, in one implementation, uses weights to assign points. For example, the gamification system assigns different weights of points based on the type of activity in a project update input by the user into the enterprise system. For example, the gamification system weighs different types of activity in a project update differently such as providing minutes of a meeting with a customer, or forwarding an e-mail from the customer to the enterprise system. In some implementations, activities that require more time or more effort are assigned more points. This is, for example, fair in terms of effort and/or quality in providing updates for those activities. The gamification system assigns more points for more details input by the user in each project update. The weights may be pre-defined and configurable. The assigned points are added to a user's cumulative total points. The gamification system presents the user's cumulative total points and enables the user to obtain more points by inputting more project updates into the enterprise system using the mobile App. This facilitates more data input of project updates to the machine learning system which is used to trained the machine learning models.

Figure 3:
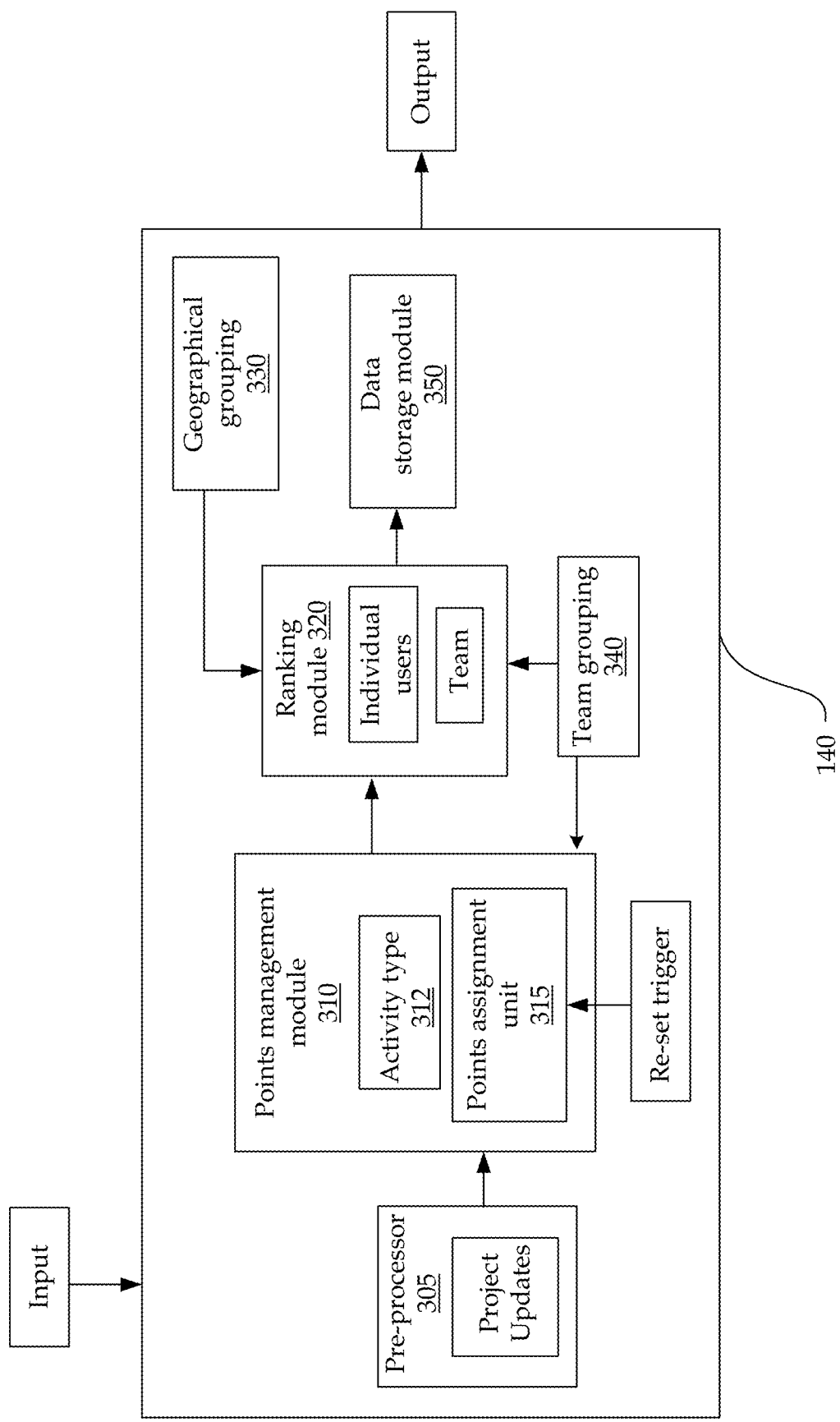
FIG. 3 shows a block diagram of an exemplary gamification system.

When a project concludes (either successful or failed), all of the activity records input by the users of the enterprise provide valuable information for training machine learning models that serves to assist the users of the enterprise in subsequent projects (e.g., sales opportunities). Furthermore, the project updates stored in the enterprise database allows a team manager to deep-dive into current sales engagements without needing to inquire the salesperson in the enterprise as well as serving as the salesperson's own journal for self-improvement FIG. 3 shows a block diagram of an exemplary gamification system. In one implementation, the gamification system includes a pre-processor module 305, a points management module 310, a ranking module 320, a geographical grouping module 330, a team grouping module 340, and a data storage module 350.

The gamification system receives the project updates from the mobile App. For example, the gamification system receives the unique identifier corresponding to a project update. The pre-processor module pre-processes the project updates received from the mobile App. In one implementation, the pre-processor module processes the project updates based on users. For example, the pre-processor module sorts the project update identifiers received from the mobile App based on users.

The points management module 310 processes the project updates to assign points to each user. In one implementation, the points management module includes an activity type identifier unit 312 and a points assignment unit 315. The activity type identifier analyzes each project update entered into the enterprise system to identify the type of activity or user action in the project update. For example, the activity type identifier queries the enterprise system using the unique identifier of the project update for details of the update. For example, the activity type identifier queries the enterprise system to determine the type of activity in the project update. For example, different types of activity include providing a textual status update of the sales engagement to the enterprise system, forwarding an e-mail containing conversation of the engagement to the enterprise system, writing a brief about a phone call with a customer.

The points assignment unit 315 contains information of the total cumulative points of users. The points assignment unit accumulates points for each individual user and adds points to a user's cumulative total points based on the activity type in the project update of the user. In one implementation, the points assignment unit applies weights to each project update based on the type of activity in the project update. For example, a status update is assigned 2 points, an e-mail is assigned 3 points, a phone call is assigned 5 points, and a meeting is assigned 7 points. For example, activities that are more difficult and/or time consuming are assigned more points. For example, an update of a phone call is assigned more points than update of an e-mail communication. In other words, a higher touch activity has a higher value than a lower touch activity and is assigned points according to its value. The points assignment unit then calculates the weighted sum of all points assigned to the project logs for each user. For example, the weighted sum of points of the status updates takes into account differences in the types of activity in the project updates provided by the user.

In one implementation, the points assignment unit further assigns points to a team with which the user is a member. For example, a team grouping module 340 contains information of teams into which individual users are grouped. The team grouping module provides information of the teams to the points assignment unit. The points assignment unit assigns points to the team each time a team member provides a project update to the enterprise system. In other words, the points assignment unit aggregates points contributed by team members. In some implementations, the framework displays high scores on a team level. For example, scores of teams are available to the public.

In one implementation, the teams' points may be configured to be re-set periodically. For example, team points re-sets (e.g., change back to zero) every quarter. A re-set trigger may be configured to re-set the team points after each predefined period. A team with the highest points for each quarter may be determined. For example, team points are calculated from the contribution of team members effective in the quarter. Such configuration allows a team to retain points gained by a member even as the member leaves the team before the quarter ends. Additionally, re-setting team points periodically also reduces negative effects when individual users move between teams. Such re-setting of team points accounts for movement of users between teams.

The ranking module receives the cumulative points for each individual user as well as the team points. In one implementation, the ranking module ranks a user with other users. In one implementation, the ranking module ranks the users globally. For example, the ranking module ranks a user with all other users of a subset of employee in the enterprise. For example, the ranking module ranks the salespeople who are providing input data to the enterprise system. Additionally, the ranking module ranks the users based on geographical area of the users of that subset of employee. For example, the ranking module receives geographical grouping information of users from the geographical grouping module and ranks the users based on geographical location.

The geographical grouping module groups users based on geographical area. In one implementation, the geographical grouping module determines the users' geographical location based on employee records from the enterprise system and groups users based on the geographical area at which they are located. Alternatively, the geographical grouping module groups users based on the geographical areas for which they are responsible. In another implementation, the geographical grouping module obtains location data of the user, for example, from the user device. The geographical grouping module groups users based on the geographical area from the location data of the users.

In some implementations, each user's points or scores are permanent and maintained even as the player moves between teams in a company. Accordingly, employees who have been longer in the company would tend to have higher scores than new hires. However, hard-working new juniors would also have the chance to gain seniority quicker. Since these points are publicly accessible within the company, it enables another dimension of seniority apart from the standard practice of job titles, salary grades and years of service.

In one implementation, the ranking module further performs team ranking. For example, the ranking module ranks sales teams for all regions and calculates the top three teams in each region. The ranking module performs team ranking based on the aggregated points of the team members. Teams with the highest points accumulated for a given region are identified as winning teams after a predefined period (e.g., a quarter). The gamification system, in implementation, notifies each region's employee engagement department of the winning team to award recognition-based rewards. All teams' points are re-set to zero after the predefined period.

The ranking module stores the ranked data in the data storage module and outputs the rankings and scores to a user. Storing the results in other locations may also be useful. In one implementation, the gamification system presents the individual ranking in the form of a leaderboard.

In one implementation, the leaderboard displays the individual ranking based on geographical area (e.g., regional). The display of the individual ranking enables a user to identify other users who are located in the same geographical area or responsible for the same geographical area. For example, salespeople of an enterprise are able to meet their nearby colleagues and collaborate on a project. The display of an individual ranking based on geographical area also advantageously mitigates the effect of cultural bias for users in providing data input to the CRM system (e.g., cultures that require extensive meetings to close a deal will not be graded in the same group as those who are able to do business mostly through e-mail).

Figure 4:
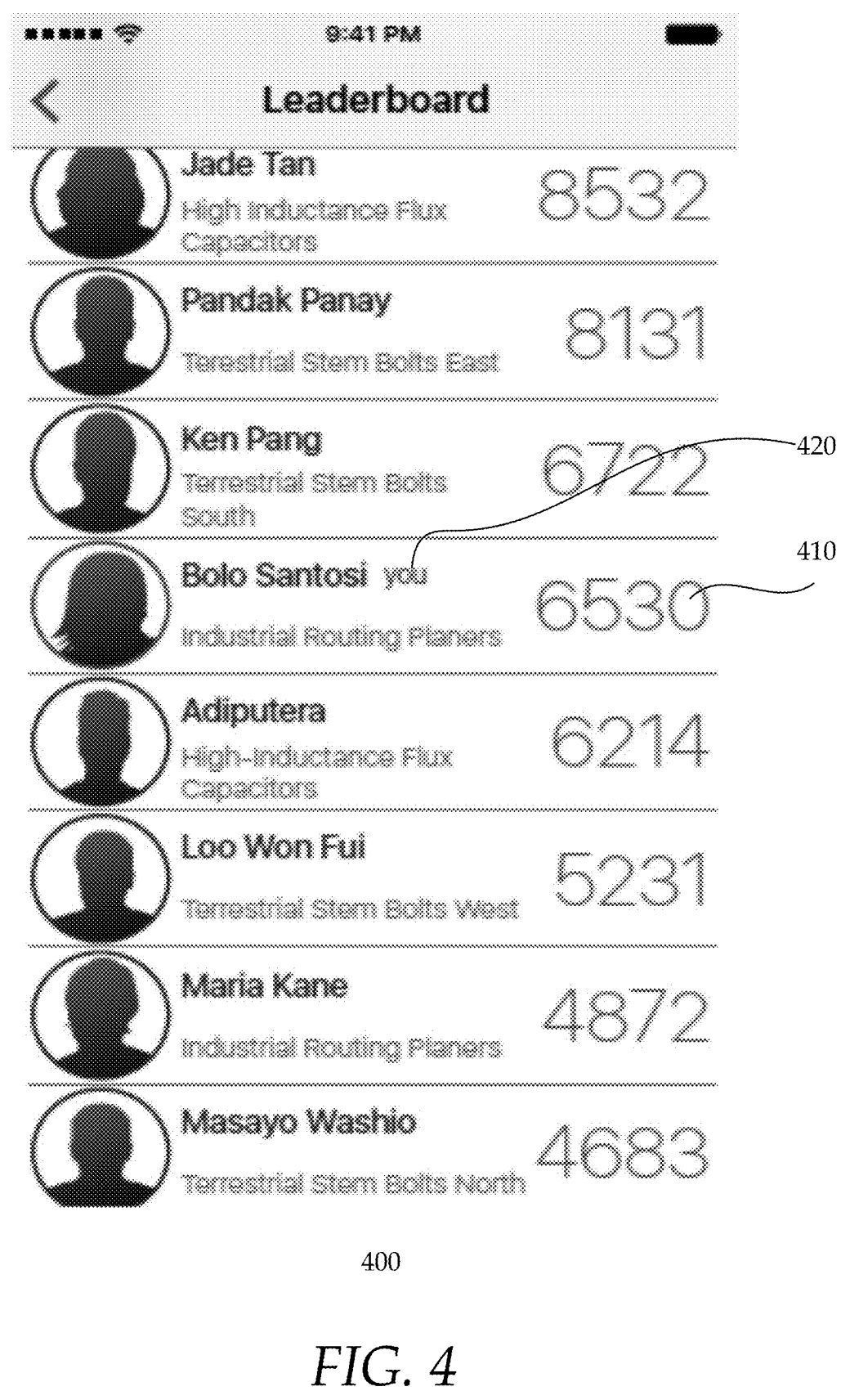

FIG. 4 shows an exemplary display 400 of individual ranking of users on a user interface of the user device. In one implementation, a leaderboard is employed to display ranking of a user with other users. For example, the leaderboard displays ranking of users based on their cumulative total points. For example, each individual user's cumulative total points are based on number of project updates input into the enterprise system and weighting of the project updates as described. Displaying the individual ranking of users in the leaderboard enables individual users to relate and form connections with other users.

In one implementation, the leaderboard displays ranking of users according to geographical area. For example, the leaderboard is configured such that it is visible to users in the same geographical area or region. For example, display of individual rankings to a user is restricted to other users located in the same geographical area or responsible for the same area. Displaying the ranking of users based on geographical area facilitates collaboration among users in the same area.

The leaderboard displays the ranking of individual users within a geographical area from highest to lowest ranked users. The leaderboard displays the ranking of individual users with their respective cumulative points 410. The display of the leaderboard ranking to a user, for example, is configured to center 420 around the user. Such ranking based on cumulative points encourages users to input more data of project updates into the enterprise system in order to obtain and accumulate more points. Displaying the ranking of individual users in other formats or configurations based on various criteria may also be useful. For example, the leaderboard may be a global leaderboard which displays the ranking for all users. In such case, the cumulative points may be public and visible to all users.

In one implementation, the mobile App displays a ranking of teams. In one implementation, the mobile App presents the ranking of teams in the form of a scoreboard.

Figure 5:
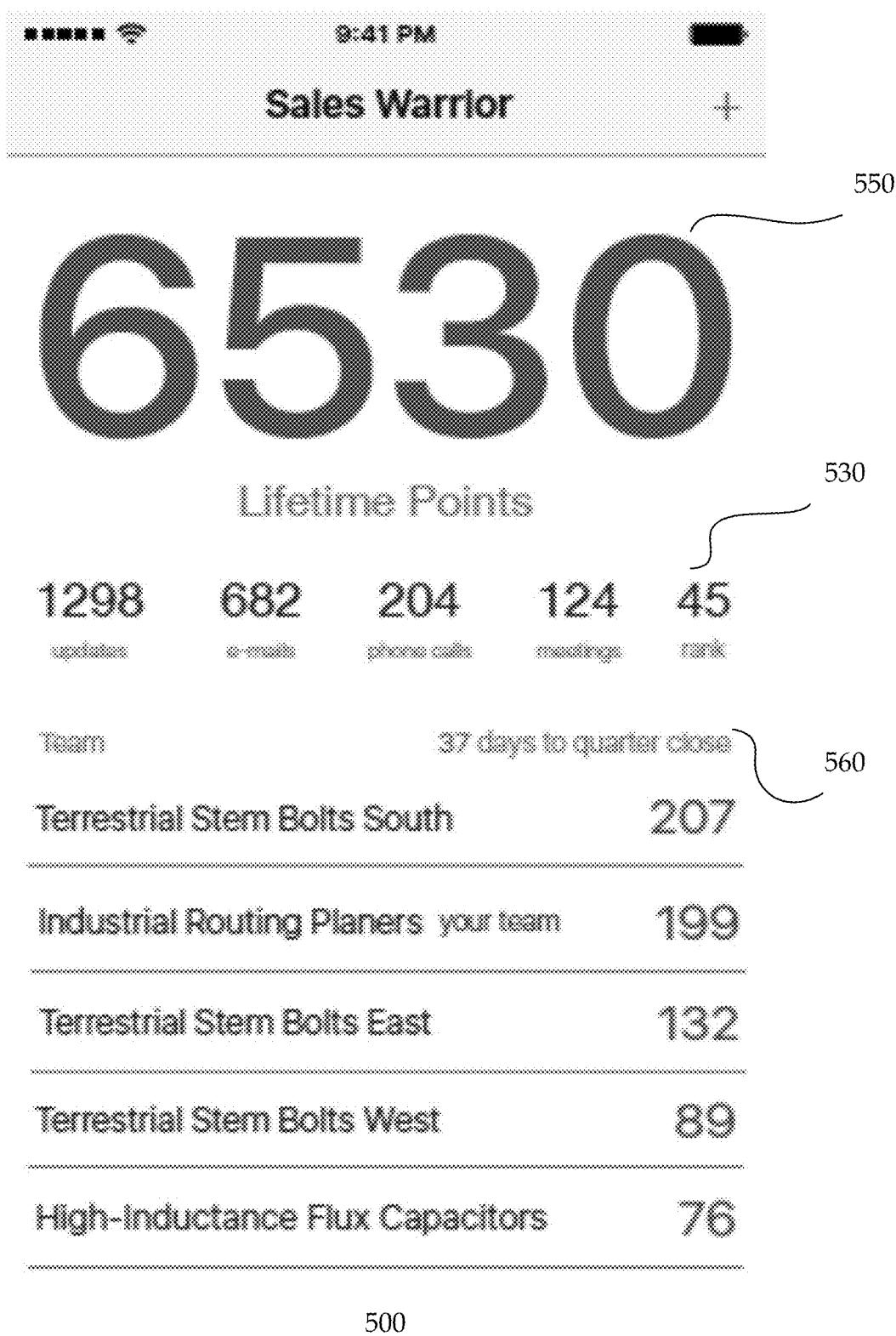
FIG. 5 shows an exemplary display of team ranking on a user interface of the user device.

FIG. 5 shows an exemplary display 500 of team ranking on a user interface of the user device. The team ranking is presented using a scoreboard which displays ranking of teams and team scores. For example, the scoreboard displays the ranking of teams from highest ranked to lowest ranked. The scoreboard displays the ranking of teams with their respective aggregated points. The aggregated points, as described, may be an aggregation of points contributed by team members for a predefined period of time. The display of team ranking, for example, may be the top three teams in each region. Teams with the highest points accumulated for a given region may be displayed as a winning team. The display of team ranking and scores enables friendly competition among users which encourages more detailed and frequent project updates by the users.

Additionally, the scoreboard displays an amount of time remaining 540 before a re-set of team points takes place. Re-setting team points encourage constructive competition between users. In one implementation, the scoreboard also displays the individual user's cumulative points 550. In some implementations, the scoreboard further displays the individual user's itemized points 560 based on activity type in the project updates provided by the user. Display of such individual user's points, for example, may be private and shown only to an individual user.

Such configuration of individual ranking and team scores by the gamification system motivates friendly competition between teams as well as individual users and encourages users to provide more detailed and frequent project updates. Additionally, the team ranking prevents users with lower points from getting disengaged from providing project updates to the enterprise system.

Figure 6:
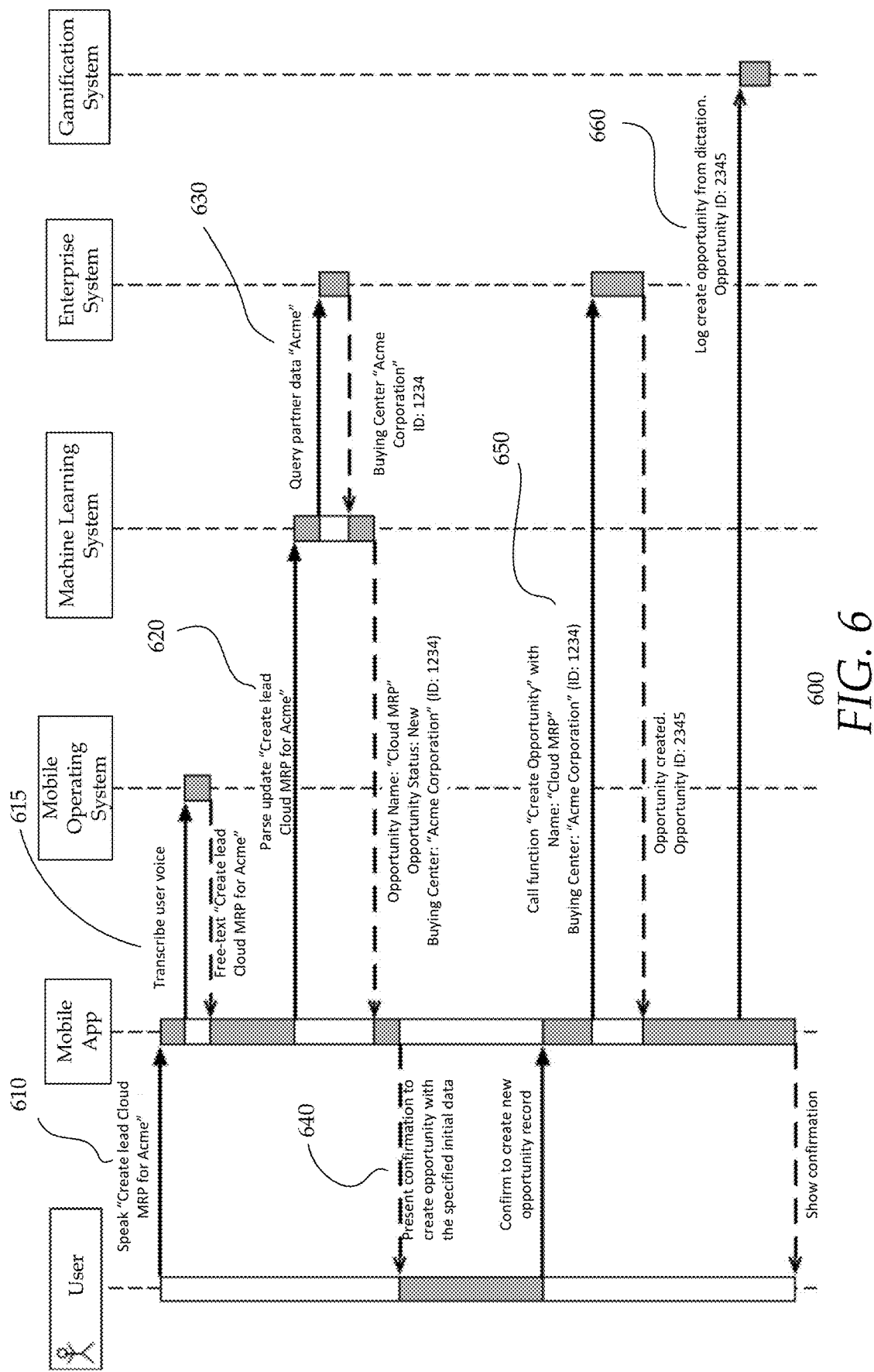
FIG. 6 shows an exemplary sequence diagram for creating a project log in an enterprise system.

FIG. 6 shows an exemplary sequence diagram 600 for creating a project log in the enterprise system via user input in the mobile App of the user device, which provides the machine learning system with the input data for machine learning. At 610, the mobile App receives user input of a project update in natural language. For example, the user input may be regarding a new sales opportunity. The user input, in one implementation, may be a speech by the user using a voice interface of the user device. The speech by the user may be in natural language such as English language, for example.

At 615, the mobile App invokes the operating system of the user device to transcribe the user's speech. The operating system of the user device, for example, may employ third party applications to convert the spoken speech to a natural language text. For example, dictation is performed on the user's speech.

At 620, the mobile App sends the natural language text to the machine learning system. The machine learning system parses the natural language text in the user input to identify semantic information using machine learning models. At 630, the machine learning system queries the enterprise system to convert the natural language text to structured project update based on structured data contained in the enterprise system. The machine learning system fetches corresponding data from the enterprise system and returns the structured project update to the mobile App.

At 640, the mobile App presents the structured project update to the user as a suggestion for creating a project log of the project update in the enterprise system. Upon receiving the user's confirmation of the suggestion, at 650, the mobile App sends the structured project update to the enterprise system. A project log of the project update is created at the enterprise system. The enterprise system returns a notification of the created project log for the project update to the mobile App. The notification for example may include a project log identifier corresponding to the project update.

At 660, the mobile App sends a notification of the project update to the gamification system. The notification, in one implementation, contains the unique identifier of the project update. The gamification system updates the respective user's individual cumulative points in response to the project update to the enterprise system by the user. Additionally, the gamification system assigns points to a team with which the user is a member. In some implementations, the gamification system may query the enterprise system to obtain more details of the project updates for assigning the points. The updated points may be displayed via the mobile App as described with respect to FIGS. 4-5.

As described, the various modules of the enterprise system, machine learning system and gamification system may be embodied as applications. For example, the various modules may be embodied as software applications. The modules may be integrated into an existing software application, as an add-on or plug-in to an existing application, or as a separate stand-alone application. The source code of the applications may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A computer-implemented method for improving a data set in an enterprise system for machine learning, comprising:
   receiving, by a mobile application via a speech interface on a user device, natural language-based input;
   transcribing, by an operating system of the user device, the natural language-based input into natural language text;
   providing, by the mobile application over a network, the natural language text to a machine learning system;
   converting, by the machine learning system, the natural language text into an enterprise system query using machine learning;
   querying, by the machine learning system using the enterprise system query, an enterprise system over a network to obtain a project update, the enterprise system comprising a structured data set of enterprise information;
   providing, by the machine learning system to the mobile application, the project update;
   displaying, by the mobile application, the project update;
   receiving, by the mobile application, user-generated input approving or modifying the project update;
   transmitting, by the mobile application to the enterprise system, data indicating an approval of the project update;
   creating a record of the project update in the enterprise system based on the transmitted data;
   receiving, by a gamification system, a notification of the project update;
   analyzing, by the gamification system, the project update provided by the user into the enterprise system using a gamification technique, wherein the gamification system quantifies the user's input of the project update to the enterprise system; and
   displaying, by the mobile application, the analysis to encourage more detailed and frequent project updates by the user.

2. The computer-implemented method of claim 1 wherein analyzing the project update by the gamification system comprises assigning points for the project update using weights based on type of activity in the project update.

3. The computer-implemented method of claim 1 wherein analyzing the project update by the gamification system comprises ranking the user with other users based on geographical location.

4. The computer-implemented method of claim 3 further comprising displaying by the mobile App the ranking of the user with other users in a leaderboard which enables individual users to relate and form connections with other users in the displayed ranking.

5. The computer-implemented method of claim 1 wherein analyzing the project update by the gamification system comprises adding points to the user's cumulative total points and team points of a team with which the user is a member.

6. The computer-implemented method of claim 5 wherein the team points are re-set periodically to account for movement of users between teams.

7. The computer-implemented method of claim 5 further comprising displaying by the mobile App the ranking of teams in a scoreboard which enables friendly competition among users to encourage more detailed and frequent project updates by the users.

8. The computer-implemented method of claim 7 wherein the scoreboard displays the user's cumulative total points and itemized points based on activities.

9. The computer-implemented method of claim 1 wherein the mobile application receives the user input of the project update from a user via a text entry field to reduce friction of data input by the user which encourages more detailed and frequent updates by the user.

10. A non-transitory computer readable medium embodying a program of instructions executable by machine to perform operations comprising:
   receiving, by a mobile application via a speech interface on a user device, natural language-based input;
   transcribing, by an operating system of the user device, the natural language-based input into natural language text;
   providing, by the mobile application over a network, the natural language text to a machine learning system;
   converting, by the machine learning system, the natural language text into an enterprise system query using machine learning;
   querying, by the machine learning system using the enterprise system query, an enterprise system over a network to obtain a project update, the enterprise system comprising a structured data set of enterprise information;
   providing, by the machine learning system to the mobile application, the project update;
   displaying, by the mobile application, the project update;
   receiving, by the mobile application, user-generated input approving or modifying the project update;
   transmitting, by the mobile application to the enterprise system, data indicating an approval of the project update;
   creating a record of the project update in the enterprise system based on the transmitted data;
   receiving, by a gamification system, a notification of the project update;
   analyzing, by the gamification system, the project update provided by the user into the enterprise system using a gamification technique, wherein the gamification system quantifies the user's input of the project update to the enterprise system; and
   displaying, by the mobile application, the analysis to encourage more detailed and frequent project updates by the user.

11. The non-transitory computer readable medium of claim 10 wherein assigning points to the user for the project update comprises using weights based on type of activity in the project update.

12. The non-transitory computer readable medium of claim 10, wherein the operations further comprise: ranking the user with other users based on geographical location and displaying the ranking of the user with the other users in a leaderboard on the user interface.

13. The non-transitory computer readable medium of claim 10 wherein assigning the points to the user comprises adding points to the user's cumulative total points and team points of a team with which the user is a member.

14. The non-transitory computer readable medium of claim 13 wherein the team points are re-set periodically to account for movement of users between teams.

15. A system for improving a data set in an enterprise system for machine learning, comprising:
   a non-transitory memory device for storing computer-readable program code; and
   a processor in communication with the memory device, the processor being operative with the computer-readable program code to perform operations comprising:
      receiving, by a mobile application via a speech interface on a user device, natural language-based input;
      transcribing, by an operating system of the user device, the natural language-based input into natural language text;
      providing, by the mobile application over a network, the natural language text to a machine learning system;
      converting, by the machine learning system, the natural language text into an enterprise system query using machine learning;
      querying, by the machine learning system using the enterprise system query, an enterprise system over a network to obtain a project update, the enterprise system comprising a structured data set of enterprise information;
      providing, by the machine learning system to the mobile application, the project update;
      displaying, by the mobile application, the project update;
      receiving, by the mobile application, user-generated input approving or modifying the project update;
      transmitting, by the mobile application to the enterprise system, data indicating an approval of the project update;
      creating a record of the project update in the enterprise system based on the transmitted data;
      receiving, by a gamification system, a notification of the project update;
      analyzing, by the gamification system, the project update provided by the user into the enterprise system using a gamification technique, wherein the gamification system quantifies the user's input of the project update to the enterprise system; and
      displaying, by the mobile application, the analysis to encourage more detailed and frequent project updates by the user.

16. The system of claim 15 wherein assigning points to the user for the project update comprises using weights based on type of activity in the project update.

17. The system of claim 15 further comprising ranking the user with other users based on geographical location and displaying the ranking of the user with the other users in a leaderboard on the user interface.

18. The system of claim 15 wherein assigning the points to the user comprises adding points to the user's cumulative total points and team points of a team with which the user is a member.

19. The system of claim 18 wherein the team points are re-set periodically to account for movement of users between teams.

* * * * *